United States Patent Office 2,957,008
Patented Oct. 18, 1960

2,957,008

PROCESS OF PREPARING THE LACTONE OF 8β-HYDROXY-2α-METHOXY - 3β,5β - EPOXY-1,2,3,4,4aα,5,8,8aα - OCTAHYDRONAPHTHALENE - 1β - CARBOXYLIC ACID

Robert Joly, Montmorency, Jean Mathieu, Montfermeil, and Julien Warnant, Neuilly-sur-Seine, France, assignors to Les Laboratoires Français de Chimiothérapie, Paris, France, a corporation of France No Drawing. Filed Jan. 5, 1959, Ser. No. 784,865

Claims priority, application France Jan. 9, 1958

2 Claims. (Cl. 260—343.3)

This invention relates to a process of preparing the lactone of 8β-hydroxy-2α-methoxy-3β,5β-epoxy-1,2,3,4,4aα,5,8,8aα-octahydronaphthalene-1β-carboxylic acid.

In co-pending, commonly assigned patent application Serial No. 693,028 of Georges Muller, Gerard Nomine, and Julien Warnant, filed October 29, 1957, and entitled "Polycyclic Compounds and Process of Preparing Same," there is described a process of preparing reserpine by starting with the dextrorotatory enantiomorph of 5β-hydroxy - 8 - oxo - 1,4,4aα,5,8,8aα - hexahydronaphthalene-1β-carboxylic acid.

One of the intermediates in the process described in said co-pending patent application is the 1,8-lactone of 6α - bromo - 7β,8β - dihydroxy - 2α - methoxy - 3β,5β-epoxy - 4aα,8aα - decahydronaphthalene - 1β - carboxylic acid which is prepared by the following sequence of operations starting with the above mentioned dextrorotatory 5β - hydroxy - 8 - oxo - 1,4,4aα,5,8,8aα - hexahydronaphthalene-1β-carboxylic acid:

(a) Lactonization of said acid by means of acetic acid anhydride in the presence of sodium acetate.

(b) Reduction of the lactone so formed by means of aluminum isopropylate.

(c) Treatment of the reduced lactone with N-bromo succinimide to form the dextrorotatory lactone of 8β-hydroxy - 2α - bromo - 3β,5β - epoxy - 1,2,3,4,4aα,5,8,8aα-octahydronaphthalene-1β-carboxylic acid.

(d) Conversion of said lactone into the lactone of 8β - hydroxy - 2α - methoxy - 3β,5β - epoxy - 1,2,3,4,4aα,5,8,8aα-octahydronaphthalene-1β-carboxylic acid by the reaction with sodium methylate.

(e) Bromination of the lactone formed in the preceding step by means of N-bromo succinimide and formation of the 1,8-lactone of 6α-bromo-7β,8β-dihydroxy-2α - methoxy - 3β,5β - epoxy - 4aα,8aα - decahydronaphthalene-1β-carboxylic acid.

The mother liquors resulting after isolation of said last mentioned compound contain essentially a mixture of two isomeric bromohydrins, the exact constitution of which cannot exactly be given with respect to their configuration and/or position. Nor do they yield reserpine when subjected to the series of reaction steps which lead to reserpine when using the 1,8-lactone of 6α-bromo-7β,8β - dihydroxy - 2α - methoxy - 3β,5β - epoxy-4aα,8aα-decahydronaphthalene -1β-carboxylic acid as starting material.

One of said isomeric bromohydrins melts at about 158–160° C. and has an optical rotation $[\alpha]_D^{20}=-45°$ to —50° (concentration: 0.5% in dioxane). The other bromohydrin melts at 184° C. and has an optical rotation $[\alpha]_D^{20}=-19°\pm3°$ (concentration: 0.5% in dioxane).

Although a number of examples of converting bromohydrins into the corresponding ethylene compounds by the action of zinc in the presence of alcohol or of acetic acid are cited in the literature, such a procedure does not permit regeneration of the lactone of 8β-hydroxy-2α - methoxy - 3β,5β - epoxy - 1,2,3,4,4aα,5,8,8aα-octahydronaphthalene-1β-carboxylic acid from the mother liquors of the 1,8-lactone of 6α-bromo-7β,8β-dihydroxy-2α - methoxy - 3β,5β - epoxy - 4aα,8aα - decahydronaphthalene-1β-carboxylic acid.

It is one object of the present invention to provide a simple, useful, and effective process of preparing the lactone of 8β-hydroxy-2α-methoxy-3β,5β-epoxy-1,2,3,4,4aα,5,8,8aα-octahydronaphthalene-1β-carboxylic acid, designated as compound II.

Other objects of the present invention and advantageous features thereof will become apparent as the description proceeds.

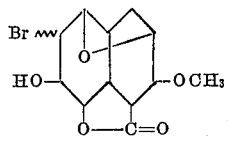    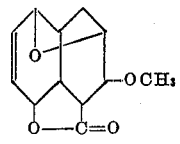

I    II

In principle the process according to the present invention consists in first isolating the mixture of isomeric bromohydrins in the form of their tosylates from the mother liquors obtained on preparing compound I in the known course of reaction. For this purpose the residue obtained from said mother liquors is reacted with toluene sulfonylchloride in the presence of a tertiary amine such as pyridine or methyl ethyl pyridine. The mixture of the resulting tosylates is then treated for a sufficient period of time with zinc and acetic acid in the presence of a third solvent which is inert with respect to the reducing agent, such as acetone or methyl ethyl ketone. The resulting compound of Formula II is then used for further reaction and conversion into reserpine.

It is to be understood that the acetic acid used in this reduction step may be replaced by other lower aliphatic acids, such as formic acid or propionic acid.

This new process of recovering compound II from the mother liquors of compound I can also be applied to a mixture of enantiomorphic or racemic bromohydrins of Formula I. The process according to the present invention does not cause racemization nor inversion or any other structural change than the desired one.

The following example serves to illustrate the present invention, without, however, limiting the same thereto. More particularly, the nature of the tertiary base used to effect tosylation, or the acid employed with the reducing agent zinc may be varied by those skilled in the art in accordance with the principles set forth herein and in the claims annexed hereto.

EXAMPLE

*Recovery of the lactone of 8β-hydroxy-2α-methoxy-3β,5β-epoxy - 1,2,3,4,4aα,5,8,8aα - octahydronaphthalene-1β-carboxylic acid (compound II) by starting with the mother liquors obtained on crystallization of the 1,8-lactone of 6α-bromo-7β8β-dihydroxy-2α-methoxy-3β5β-epoxy - 4aα,8aα - decahydronaphthalene - 1β - carboxylic acid (compound I)*

(a) ISOLATION OF THE BROMO COMPOUNDS FROM SAID MOTHER LIQUORS 100 g. of the dextrorotatory compound II are added with agitation to one liter of water containing 5 cc. of sulfuric acid (66° Bé). The mixture is heated to 50° C. for several minutes. Most of the compound dissolves. Without discontinuing agitation 90 g. of N-bromo succinimide are added. First dissolution takes place which is followed by crystallization of the bromo compound of Formula I. The crystals are filtered without previous cooling after stirring for 20 minutes. The crystals of compound I obtained thereby are washed by forming a paste with water and filtering said paste with suction. The yield of dry product is 70–79% of the theoretical yield; the melting point is 203° C., its optical rotation $[\alpha]_D^{20} = 125°$ (concentration: 0.5% in dioxane).

The mixture of mother liquors and filtrates from the pasting of compound I with water is cooled to 20° C. and treated with a solution of sodium bisulfite (35° Bé.) until starch-iodine paper no longer turns blue (destruction of excess N-bromo succinimide added). The mixture is then saturated with sodium chloride, filtered, and extracted with methylene chloride. The organic extracts are dried over sodium sulfate, filtered, and evaporated to dryness in a vacuum. The dried residue which weighs between 36 g. and 40 g., consists mostly of a mixture of the above mentioned bromohydrins with a small amount of compound I.

(b) TOSYLATION OF THE MOTHER LIQUOR PRODUCTS 25 g. of the residue obtained as described above are introduced into 50 cc. of anhydrous pyridine, and 25 g. of toluene sulfonyl chloride are added to the resulting suspension while stirring. Exothermic reaction sets in and the reaction mixture goes completely into solution. The solution is allowed to stand for 24 hours and is then poured into water. A mixture of tosylates precipitates thereby. The precipitate is filtered and washed by pasting it with water and filtering the paste by suction until no more chloride ions can be detected in the wash waters. After drying, 35 g. of tosylates are obtained (corresponding to a yield of 94% of the theoretical amount); said tosylates contain 17.1% of bromine (theoretical content: 16.92%).

(c) TREATMENT OF THE CRUDE TOSYLATES WITH ZINC POWDER 10 g. of zinc powder are added at once to a well agitated suspension of 20 g. of the above described tosylates in 80 cc. of acetone. The suspension is refluxed without interrupting agitation. As soon as boiling has commenced, 20 cc. of acetic acid are added in small portions. Refluxing is continued for two hours. The reaction mixture is then cooled. The zinc is filtered off and washed with acetone. The acetone wash liquids are added to the filtrate and the acetone is distilled off in a vacuum. To the remaining acetic acid solution there are added 100 cc. of dichloro ethane and 50 cc. of water and the mixture is neutralized by the addition of sodium bicarbonate. The dichloro ethane layer is decanted, washed with water, dried over sodium sulfate and filtered. The solvent is distilled off completely. The residue is dissolved in boiling methanol and the solution is cooled in an ice bath. Thereby the desired lactone of Formula II crystallizes. It is filtered and washed by forming a paste with methanol and filtering said paste by suction. On drying, 7 g. of compound II are obtained; melting point: 100° C.; optical rotation $[\alpha]_D^{20} = 50° \pm 2°$ (concentration: 0.5% in ethanol). The yield is 70% of the theoretical amount calculated for the mixture of bromohydrins isolated from the starting mother liquors.

We claim:

1. In the process of producing the 1,8-lactone of 6α-bromo - 7β,8β - dihydroxy - 2α - methoxy - 3β,5β-epoxy - 4aα,8aα - decahydronaphthalene - 1β - carboxylic acid by the steps of brominating a 1,8-lactone of 8β-hydroxy - 2α - methoxy - 3β,5β - epoxy - 1,2,3,4,4aα,5,8,8aα-octahydronaphthalene-1β-carboxylic acid with an N-bromo succinimide in an aqueous acidic solution, cooling and separating crystals of said 1,8-lactone of 6α-bromo - 7β,8β - dihydroxy - 2α - methoxy - 3β,5β-epoxy - 4aα,8aα - decahydronaphthalene - 1β - carboxylic acid free from other isomeric bromohydrins from the mother liquor, the improvement which comprises isolating isomeric bromohydrins from said mother liquor obtained from said crystallization step, treating said isomeric bromohydrins with toluene sulfonylchloride in the presence of a tertiary base, subjecting the resulting toluene sulfonate of said isomeric bromohydrins to the action of zinc and a lower aliphatic acid selected from the group consisting of formic acid, acetic acid and propionic acid in the presence of an organic solvent until splitting off of bromine is substantially completed, recovering the 1,8-lactone of 8β-hydroxy-2α-methoxy-3β,5β-epoxy - 1,2,3,4,4aα,5aα - octahydronaphthalene - 1β - carboxylic acid and recycling said lactone to said brominating step.

2. A process of converting the mixed isomeric bromohydrins contained in the mother liquors after crystallization of the 1,8-lactone of 6α-bromo-7β,8β-dihydroxy-2α - methoxy - 3β,5β - epoxy - 4aα,8aα - decahydronaphthalene-1β-carboxylic acid therefrom into the lactone of 8β - hydroxy - 2α - methoxy - 3β,5β - epoxy - 1,2,3,4, 4aα,5,8,8aα - octahydronaphthalene - 1β - carboxylic acid, which comprises the steps of extracting said mother liquors with methylene chloride, evaporating the dried extracts to dryness in a vacuum, suspending the evaporation residue in anhydrous pyridine, adding to the suspension toluene sulfonylchloride, allowing the reaction mixture to stand until tosylation is completed and the tosylates of the mixed isomeric bromohydrins are precipitated, suspending the resulting tosylates in acetone, adding zinc powder and acetic acid to said suspension while heating, and stirring and heating the reaction mixture to boiling under reflux until conversion of the tosylates into the lactone of 8β-hydroxy-2α-methoxy-3β,5β - epoxy - 1,2,3,4,4aα,5,8,8aα - octahydronapthalene-1β-carboxylic acid is completed.

No references cited.

UNITED STATES PATENT OFFICE
CERTIFICATE OF CORRECTION

Patent No. 2,957,008 October 18, 1960

Robert Joly et al.

It is hereby certified that error appears in the printed specification of the above numbered patent requiring correction and that the said Letters Patent should read as corrected below.

Column 1, line 48, for "cedirng" read -- ceding --; column 2, line 59, for "7β8β" read -- 7β,8β --, same line, for "3β5β" read -- 3β,5β --; column 3, line 6, for "125°" read -- -125° --; column 4, line 2, for "50°" read -- +50° --; line 29, for "5aα" read -- 5,8,8aα --.

Signed and sealed this 25th day of April 1961.

(SEAL)
Attest:
ERNEST W. SWIDER
Attesting Officer

DAVID L. LADD
Commissioner of Patents